US010926339B2

(12) United States Patent
Muto

(10) Patent No.: US 10,926,339 B2
(45) Date of Patent: Feb. 23, 2021

(54) DEBURRING TOOL AND DEBURRING METHOD

(71) Applicant: SUGINO MACHINE LIMITED, Uozu (JP)

(72) Inventor: Mitsuru Muto, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 0 days.

(21) Appl. No.: 16/550,893

(22) Filed: Aug. 26, 2019

(65) Prior Publication Data

US 2020/0130071 A1    Apr. 30, 2020

(30) Foreign Application Priority Data

Oct. 26, 2018   (JP) .............................. JP2018-202366

(51) Int. Cl.
*B23B 31/08* (2006.01)
*B23B 51/10* (2006.01)

(52) U.S. Cl.
CPC ............ *B23B 51/101* (2013.01); *B23B 31/08* (2013.01); *B23B 2220/08* (2013.01); *B23B 2270/027* (2013.01)

(58) Field of Classification Search
CPC ... B23B 31/08; B23B 2270/027; B23Q 11/04; Y10T 409/309352
See application file for complete search history.

(56) References Cited

U.S. PATENT DOCUMENTS

2018/0318938 A1*   11/2018   Fasold-Schmid ..... B23B 31/205
2019/0084056 A1*    3/2019   Sweet ..................... B23B 31/08

FOREIGN PATENT DOCUMENTS

EP    1052044 A1    11/2000
JP    5368537 B2    12/2013

OTHER PUBLICATIONS

Extended European Search Report dated Mar. 4, 2020 in a corresponding European patent application No. 19192936.3 (9 pages).

* cited by examiner

*Primary Examiner* — Alan Snyder
(74) *Attorney, Agent, or Firm* — United IP Counselors, LLC

(57) ABSTRACT

A deburring tool for stable processing is provided. The deburring tool includes a cylindrical housing; a spindle loosely fitted and supported to be tiltable with respect to an axis of the housing, the spindle having a rotatable attachment portion for detachably attaching a cutting tool at a distal end; a pressed member arranged to the spindle; a piston slidably disposed inside the housing, the piston configured to press the pressed member toward the distal end; an elastic member configured to urge the piston toward the distal end; a separate ring arranged between the piston and the elastic member; and a flow path for supplying a compressible fluid between the separate ring and the piston.

19 Claims, 6 Drawing Sheets

DEBURRING TOOL AND DEBURRING METHOD

CROSS-REFERENCE TO RELATED APPLICATIONS

This application claims the benefit of priority to Japanese Patent Application No. 2018-202366, filed on Oct. 26, 2018, the entire contents of which are hereby incorporated by reference.

BACKGROUND

1. Technical Field

The present invention relates to a deburring tool and a deburring method.

2. Description of the Background

Conventionally, there has been known a deburring tool which is attached to a robot or the like and deburrs an aluminum die cast product or the like (Japanese Patent No. 5368537, hereinafter referred to as "Patent Literature 1").

In the conventional deburring tool, a tool holding portion to which a cutting tool is mounted is loosely fitted and supported so as to be tiltable with respect to an axis. Then, the cutting tool is tilted to follow the contour of the workpiece. As a result, the processed surface is uniformly finished corresponding to the burrs to be removed.

The pressing force in the axial direction of the tool holder is adjusted by a spring which urges the tool holder along the axial direction.

Air pressure is stopped (air OFF state) to teach the robot the place of deburring before processing. At this time, the posture returning force by the spring acts alone, and the tilted tool holding portion returns to the original position.

At the time of deburring, the air pressure supplied from the air compressor is further applied to the elastic reaction force of the spring (air ON state). A driving force (spring pressure+air pressure) for pressing the tool holding portion is applied to the deburring tool, and the deburring process is performed while the cutting edge of the cutting tool is pushed into the workpiece by a predetermined amount.

BRIEF SUMMARY

In the conventional deburring tool, deburring, which is intermittent machining, is performed, and the machining surface on the workpiece side is also not uniform, so that minute vibration is generated during machining.

In this case, a mechanical spring having a high reaction rate and repeating the expansion and contraction motion tends to further amplify the vibration.

As a result, the work surface on the work side is roughened, and the life of the cutting tool is shortened.

A driving force (spring pressure+air pressure) for pressing the tool holding portion is applied to the deburring tool. The returning force (working pressure) is a combined force of the spring and the air pressure. Therefore, the degree of change in the machining pressure is low with respect to the amount of change of the air pressure, the amount adjustment is small, and thus it is difficult to handle various burrs.

An object of the present invention is to provide a deburring tool for stable processing.

The first aspect of the present invention provides a deburring tool, including:

a cylindrical housing;

a spindle loosely fitted and supported to be tiltable with respect to an axis of the housing, the spindle having a rotatable attachment portion for detachably attaching a cutting tool at a distal end;

a pressed member arranged to the spindle;

a piston slidably disposed inside the housing, the piston configured to press the pressed member toward the distal end;

an elastic member configured to urge the piston toward the distal end;

a separate ring arranged between the piston and the elastic member; and a flow path for supplying a compressible fluid between the separate ring and the piston.

A second aspect of the present invention provides a deburring method, including:

supplying a compressible fluid between a separate ring and a piston;

separating the separate ring from the piston by a fluid pressure of the compressible fluid;

urging, by the piston, an outer peripheral edge of a center disk toward a tapered ring;

pushing up the piston by the center disk tilted by a radial force applied to a cutting tool rotated with a spindle; and pushing down the outer peripheral edge by the piston due to the compressible fluid to restore the tilt of the center disk.

The deburring tool of the present invention achieves stable processing.

DETAILED DESCRIPTION

Figure 1:
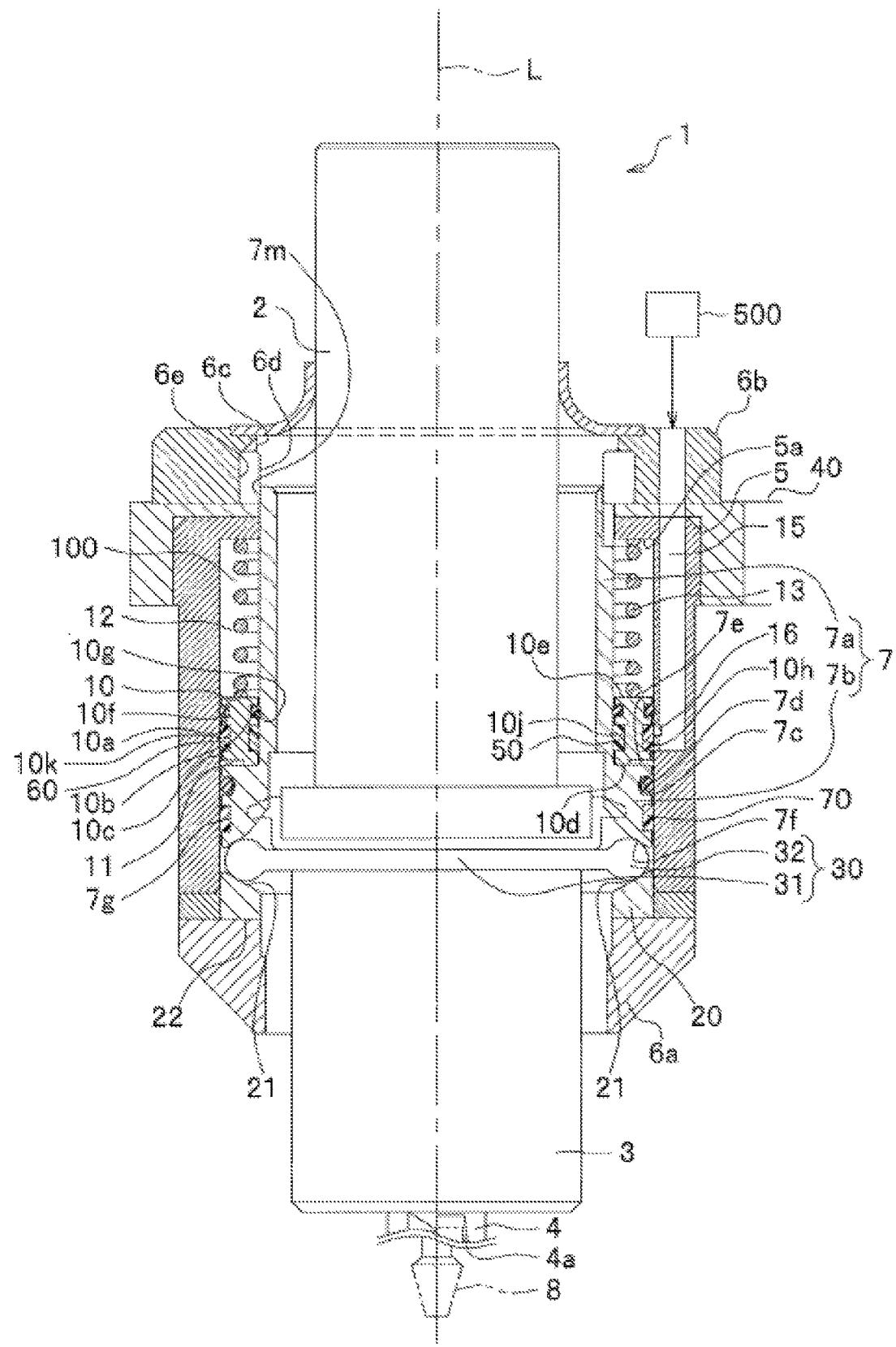
FIG. 1 is a vertical cross-sectional view of an embodiment of a deburring tool.
Figure 2:
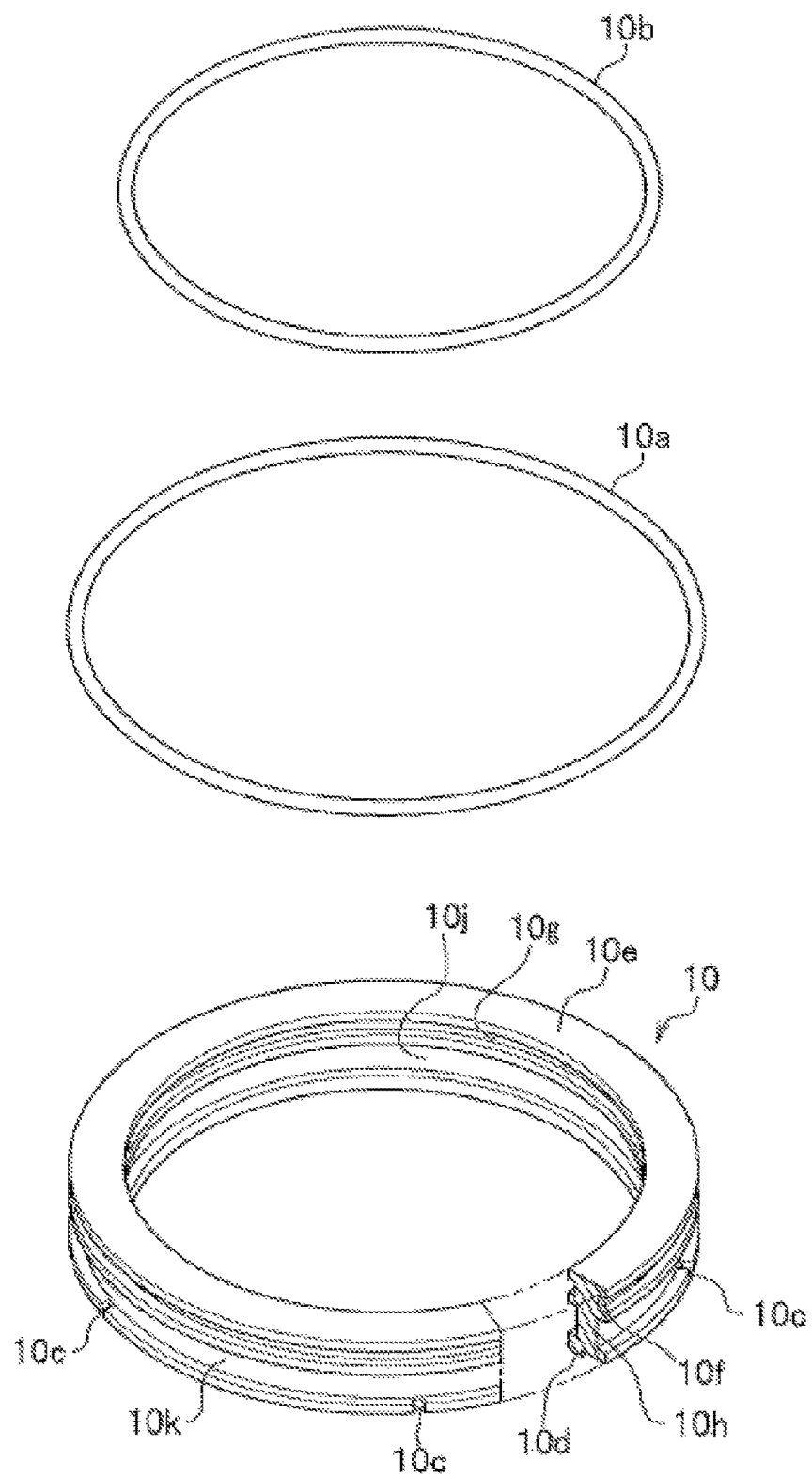
FIG. 2 is a perspective view of a separate ring of the embodiment partially cut away.

Hereinafter, an embodiment of the present invention will be described with reference to the drawings as appropriate. The same elements are denoted by the same reference numerals, and a repetitive description thereof is omitted.

As shown in FIG. 1, the deburring tool 1 includes a housing 5, a piston 7, a tapered ring 20, a spindle device 3, a center disk (pressed member) 30, a separate ring 10, a spring (elastic member) 13 which is an elastic body, and a flow path 15.

The housing 5 has a hollow cylindrical shape. The housing 5 is fixed to a machine tool or a robot (not shown) via a support member 40.

The housing 5 contains a motor 2, the spindle device 3, the piston 7, the separate ring 10, the spring 13 and the flow path 15. A front cover 6a and a rear cover 6b are respectively attached to both ends of the housing 5. The motor 2 has a cylindrical shape. The motor 2 is fixed to the center disk 30.

The spindle device 3 is fixed to the center disk 30. The spindle device 3 is arranged coaxially with the motor 2. The spindle device 3 rotatably supports the spindle 4. A cutting tool 8 used for deburring is detachably attached to the attachment portion 4a of the spindle 4.

The motor 2, the spindle device 3, and the center disk 30 are loosely fitted and supported so as to be tiltable with respect to an axis L passing through the center line of the housing 5.

The piston 7 is integrally formed with a cylindrical body portion 7a and a ring-shaped seal flange portion 7b. The seal flange portion 7b is higher in the outer diameter direction than the outer peripheral surface on the one side end of the body portion 7a. The body portion 7a and the seal flange portion 7b are connected to each other in the axial L-direction. The piston 7 is slidably disposed inside the housing 5.

A ring-shaped seal groove 7c is recessed in the outer peripheral surface of the seal flange portion 7b. A ring-shaped seal ring 7d is mounted in the seal groove 7c.

A ring-shaped wear groove 7g is recessed in the outer peripheral surface of the seal flange portion 7b in parallel with the seal groove 7c.

A wear ring (second wear ring) 70 is mounted on the wear groove 7g. The wear ring 70 is made of a resin material having flexibility and good sliding property.

The seal flange portion 7b has a piston-side tapered surface 7f on the distal end side. The piston-side tapered surface 7f is inclined at a constant inclination with the diameter increasing toward the distal end side.

The piston 7 presses the piston-side tapered surface 7f against the center disk 30.

In the seal flange portion 7b, the wear ring 70 is mounted side by side on the seal ring 7d of the outer peripheral surface. Therefore, the tilt of the seal flange portion 7b is suppressed, and is aligned along the axis L even when the piston 7 slides, so that the seal flange portion 70b is smoothly moved in a straight line.

The housing 5 contains the separate ring 10 and the spring 13 for urging the piston 7 toward the distal end in a housing space 100 located on the outer side of the body portion 7a of the piston 7.

The separate ring 10 is arranged between the spring 13 and the pressure receiving surface 7e of the piston 7 for moving the spindle device 3. The separate ring 10 is annular. The separate ring 10 is made of metal, for example.

Annular seal grooves 10f and 10g are formed on the inner peripheral surface and the outer peripheral surface of the separate ring 10. The seal rings 10a, 10b are fitted into the seal grooves 10f, 10g. The separate ring 10 has an abutting surface 10d and a back surface 10e on the end surface in the direction of the axis L.

Figure 4:
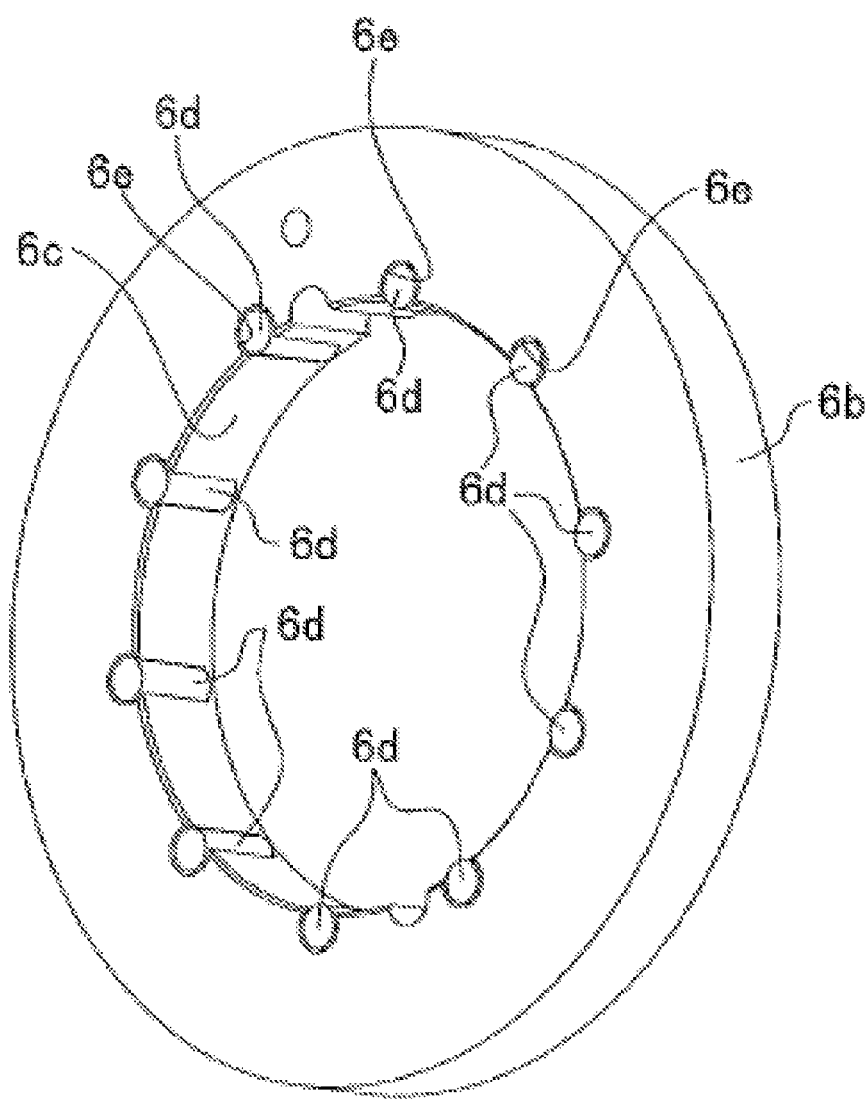
FIG. 4 is a perspective view illustrating a state in which guide pins are provided on an inner peripheral surface of a rear cover in the deburring tool of the embodiment.

As shown in FIG. 4, a plurality of groove portions 6e are formed on the inner peripheral surface 6c of the rear cover 6b. The guide pins 6d are inserted into the groove portions 6e. The guide pins 6d are made of Teflon resin. The guide pin 6d linearly contacts the outer peripheral surface 7m of the rear end of the piston 7, thereby suppressing the inclination of the piston 7. The guide pins 6d improve the slidability of the piston 7 in the housing 5.

An annular groove portion 10j is formed on the inner peripheral surface of the separate ring 10. The wear ring 50 is fitted into the groove portion 10j. An annular groove 10k is formed on the outer peripheral surface of the separate ring 10. A wear ring (first wear ring) 60 is fitted in the groove 10k. The wear rings 50, 60 are made of a resin material having flexibility and good sliding property.

The wear rings 50, 60 are fitted on the inner and outer circumferential surfaces of the separate ring 10, so that the separate ring 10 slides smoothly. Even if contact unevenness of the seal rings 10a and 10b occurs, the inclination of the separate ring 10 can be suppressed. By using the wear rings 50, 60, it is possible to prevent the separate ring 10 and the housing 5 from contacting each other, thereby to reduce the galling.

Between the abutting surface 10d and the back surface 10e, a compressible fluid supply groove 10h is formed in an annular shape. The compressible fluid supply groove 10h faces the supply hole 16 (see FIG. 1) formed in the partition wall of the flow path 15. The compressible fluid supply groove 10h communicates the space in the first chamber 11 and the space in the flow path 15 via a plurality of groove-shaped communication grooves 10c. A plurality of communication grooves 10c are formed at equal intervals on the circumference.

It is sufficient that the compressible fluid can be vented so as to flow into the first chamber 11 from a gap existing between the inner wall of the housing 5 and the outer wall of the separate ring 10, and the communication groove 10c may be omitted.

As shown in FIG. 1, the separate ring 10 is slidably disposed in the housing space 100 in the direction of the axis L with respect to the outer peripheral surface of the body portion 7a of the piston 7.

In the separate ring 10, the annular seal rings 10a, 10b fitted in the seal grooves 10f, 10g are slid inside the housing to maintain the sealing property.

The separate ring 10 partitions and blocks the housing space 100 into a first chamber 11 and a second chamber 12. The first chamber 11 is located forward and the second chamber 12 is located rearward.

The compressible fluid supply unit 500 (see FIG. 3) pumps the compressible fluid into the flow path 15. The compressible fluid is supplied from the flow path 15 through the supply hole 16, the compressible fluid supply groove 10h, and the communication groove 10c into the first chamber 11 between the separate ring 10 and the pressure receiving surface 7e of the piston 7. The compressible fluid is, for example, air or nitrogen.

The first chamber 11 is defined by the pressure receiving surface 7e of the seal flange portion 7b and the separate ring 10. By communicating with the flow path 15, the compressible fluid is supplied from the compressible fluid supply unit 500.

The supply hole 16 may face the first chamber 11 so as to supply the compressible fluid (air) directly from the supply hole 16 to the first chamber 11.

A spring 13 is disposed in the second chamber 12. One end of the spring 13 abuts against the seating surface 5a of the housing 5. The other end of the spring 13 abuts against the back surface 10e of the separate ring 10. The spring 13 urges the separate ring 10 in a direction in which the abutting surface 10d approaches the pressure receiving surface 7e of the piston 7.

When the compressible fluid is supplied from the compressible fluid supply unit 500 to the first chamber 11 (air ON state: see FIG. 3), the pressure of the compressible fluid presses the separate ring 10 toward the seating surface 5a against the urging force of the spring 13.

Since the compressible fluid pressure supplied from the compressible fluid supply unit 500 is also applied to the pressure receiving surface 7e of the piston 7, the piston 7 is pushed distally.

When the supply of the compressible fluid from the compressible fluid supply unit 500 to the first chamber 11 is stopped (air OFF state: see FIG. 1), the urging force of the spring 13 causes the separate ring 10 to move toward the piston 7, thus causing the abutting surface 10d to abut against the pressure receiving surface 7e.

As described above, by switching on or off the supply of the compressible fluid from the compressible fluid supply unit 500, it is possible to select a state in which the separate ring 10 is pressed toward the seating surface 5a against the elastic reaction force of the spring 13 to separate the abutting surface 10d from the pressure receiving surface 7e of the piston 7, and a state in which the abutting surface 10d abuts the pressure receiving surface 7e.

When the abutting surface 10d is separated from the pressure receiving surface 7e, only the compressible fluid is interposed between the pressure receiving surface 7e and the separate ring 10. Therefore, the elastic reaction force of the spring 13 applied from the separate ring 10 to the pressure receiving surface 7e is not affected or reduced, and the contribution rate of the piston 7 to be pressed by the pressure of the compressible fluid from the compressible fluid supply unit 500 can be increased. Therefore, by increasing the amount of adjustment by improving the degree of change in the processing pressure with respect to the amount of change in the pressure of the compressible fluid, it is possible to process various burrs.

The tapered ring 20 is disposed inside the distal end portion of the housing 5. The tapered ring 20 is annular. The tapered ring 20 has a tapered surface 21 which is inclined at a constant inclination so as to decrease in diameter toward the tip side, on the end surface on the piston 7 side.

The tapered ring 20 has a distal end surface 22 (see FIG. 1) on the side opposite to the piston 7. The distal end surface 22 abuts against the front cover 6a in the axial direction L. As a result, even if the machining pressure to the distal end side is applied from the piston 7, the tapered ring 20 does not move in the direction of the axis L.

When a radial force is applied to the cutting tool 8, the most distal end portion of the inclined center disk 30 comes into contact with the tapered surface 21. The tapered surface 21 suppresses the radial movement of the spindle device 3. In addition, since the tapered surface 21 strongly contacts the center disk 30 and the inner surface of the housing 5, wear of the housing 5 and the center disk 30 is suppressed.

The center disk 30 has a base surface portion 31 and an outer peripheral edge 32. The base surface portion 31 has a disk shape of a thin plate. The outer peripheral edge 32 is thicker than the base surface portion 31. The outer peripheral edge 32 is integrally provided along the outer periphery of the base surface portion 31, and has a substantially circular radial cross-section.

The outer peripheral edge 32 is arranged between the piston-side tapered surface 7f of the piston 7 and the tapered surface 21 of the tapered ring 20. The piston-side tapered surface 7f is inclined at a constant angle in a direction with the diameter increasing toward the distal end side.

The piston-side tapered surface 7f and the tapered surface 21 of the tapered ring 20 are disposed symmetrically with respect to the center disk 30.

An R surface is formed on the surface of the outer peripheral edge 32 of the center disk 30. The R surface slidably comes into contact with the piston-side tapered surface 7f and the tapered surface 21, respectively, while being sandwiched from both sides in the direction of the axis L.

The center disk 30 causes the piston-side tapered surface 7f and the tapered surface 21 to slide on the outer peripheral edge 32 by the pressing force from the piston 7, thereby suppressing the radial movement and restoring the attitude of the cutting tool 8 in the centering direction in which the center axis of the spindle device 3 coincides with the axis L of the housing 5.

Next, the operation and effect of the deburring tool 1 of the present embodiment will be described.

In the deburring tool 1 of the present embodiment, the compressible fluid supplied from the compressible fluid supply unit 500 passes through the flow path 15, the supply hole 16, and the communication groove 10c of the separate ring 10, and is supplied to the first chamber 11 between the separate ring 10 and the spindle device 3 (air ON state).

Due to the uniform air pressure in the first chamber 11, inclination of the separate ring 10 with respect to the axis L of the housing 5 is less likely to occur around the piston 7, and the separate ring 10 slides smoothly.

Figure 3:
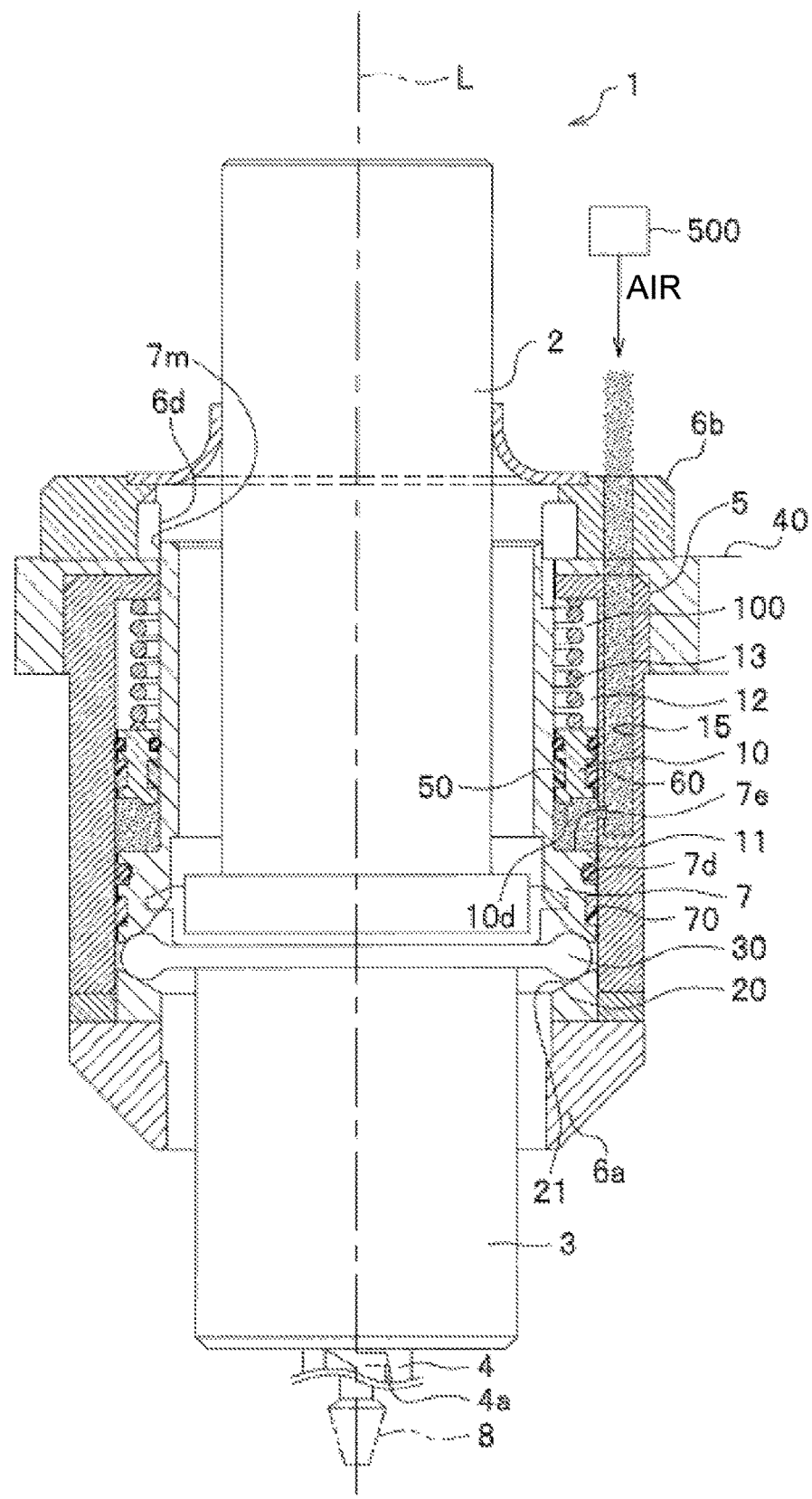
FIG. 3 is a vertical cross-sectional view showing the use of the deburring tool of the embodiment.

As shown in FIG. 3, in the air ON state, the piston 7 is pushed in the distal direction by the compressible fluid introduced into the housing 5. At the same time, the compressible fluid introduced into the housing 5 pushes the separate ring 10 toward the seating surface 5a against the urging force of the spring 13, and the abutting surface 10d of the separate ring 10 is separated from the pressure receiving surface 7e of the piston 7.

During pressurization, the spring pressure of the spring 13 is not directly applied to the spindle device 3, and vibration during machining is absorbed by the compressible fluid. Therefore, amplification of vibration of the cutting tool 8 can be suppressed, and stable machining can be performed. The machining accuracy of the machining surface on the workpiece side is improved. In addition, the life of the cutting tool 8 is extended by reducing the vibration applied to the cutting tool 8.

When the piston 7 is pushed in the distal direction by the compressible fluid introduced into the housing 5, the center disk 30 is urged by the compressible fluid pressure. Therefore, the center axis of the spindle device 3 is aligned with the axis L of the housing 5, the inclination of the spindle device 3 is suppressed, and the posture of the cutting tool 8 is restored.

Further, the piston-side tapered surface 7f located on the side opposed to the tapered surface 21 slidably comes into contact with the outer peripheral edge 32 by the pressure from the piston 7. The outer peripheral edge 32 slidably comes into contact with the tapered surface 21 and the piston-side tapered surface 7f from both front and rear sides, and even if the cutting tool 8 is inclined, the position is more quickly centered and returns, and stable machining is enabled.

As shown in FIG. 1, when the compressible fluid supply unit 500 is stopped in the air OFF state, the compressible fluid is not supplied from the compressible fluid supply unit 500 to the first chamber 11.

In the air OFF state, the pressure receiving surface 7e of the piston 7 comes into contact with the abutting surface 10d of the separate ring 10 by the spring pressure of the spring 13.

Therefore, the spring pressure is directly applied to the center disk 30. Therefore, in the air OFF state, the inclination is returned by the spring pressure, and the attitude of the spindle device 3 is restored by centering.

As described above, even in the air OFF state in which the driving force is not required, the posture of the spindle device 3 can be restored.

When the cutting tool 8 is tilted, the tilt is returned by the pressure from the piston 7 so that the center axis of the spindle device 3 coincides with the axis L, and the attitude is returned by the centering.

In the air ON state, the piston 7 is pressed by the compressible fluid to cause the outer peripheral edge 32 of the center disk 30 to slidably come into contact with the tapered surface 21 of the tapered ring 20. In the air OFF state, the piston 7 is pressed by the spring pressure of the spring 13 to cause the outer peripheral edge 32 of the center disk 30 to slidably come into contact with the tapered surface 21 of the tapered ring 20.

Therefore, regardless of whether the cutting tool 8 is tilted in the air ON state or the air OFF state, the posture of the spindle device 3 is returned to the posture suitable for deburring so that the central axis of the spindle device 3 coincides with the axis L, and the machining can be performed stably.

When a plurality of guide pins 6d are provided on the inner peripheral surface of the rear cover 6b, the plurality of guide pins 6d support the outer peripheral surface 7m of the rear end of the piston 7 by line contacts, so that the inclination of the piston 7 can be suppressed. Further, by the inclination of the piston 7, it is possible to reduce sliding resistance generated by contacting the inner peripheral surfaces of the housing 5 and the rear cover 6b.

The inner and outer sides of the separate ring 10 are restrained by seal rings 10a and 10b. Therefore, the separate ring 10 does not easily move in the direction of the axis L.

Therefore, it is desirable to arrange the wear rings 50 and 60 on the inner peripheral surface and the outer peripheral surface in a set arrangement with the seal rings 10a and 10b.

When the wear rings 50 and 60 are provided, the sliding resistance is reduced because the separate ring 10 is supported by the wear rings 50 and 60.

This establishes a slidable structure with two sealing surfaces.

Even in the air ON state, the pressure of the compressible fluid may instantaneously drop, and the separate ring 10 may come into contact with the piston 7. Also in this case, the elastic force of the spring 13 urges the piston 7 via the separate ring 10. Then, the posture of the spindle device 3 is restored.

First Modification

Figure 5:
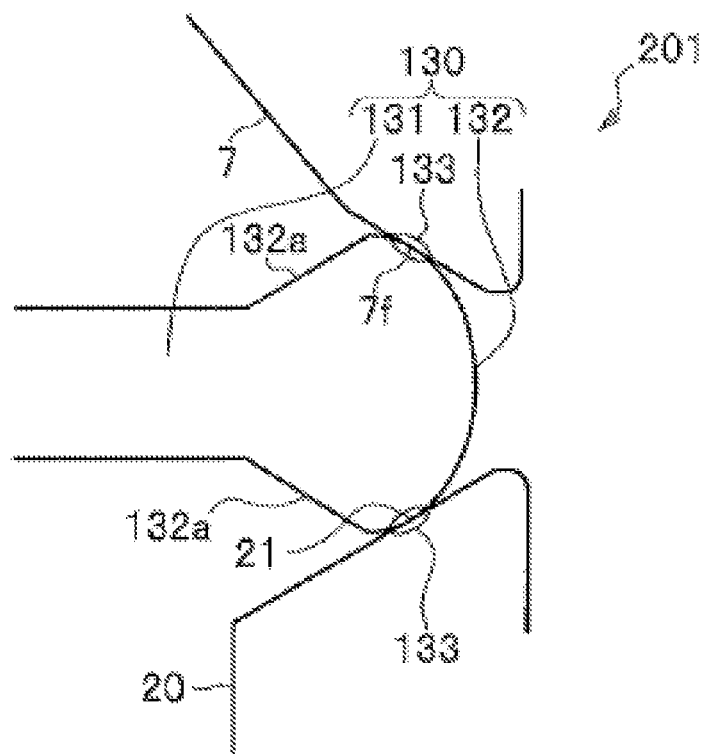
FIG. 5 is an enlarged cross-sectional view showing an end portion of the center disk of the First Modification.

FIG. 5 is an enlarged cross-sectional view of a main part of a portion where the center disk (pressed member) 130 abuts against the piston 7 and the tapered ring 20 in the deburring tool 201 of the first modification.

In the deburring tool 201 of the first modification, the outer peripheral edge 132 is located at the peripheral edge of the surface portion 131 of the center disk 130. The outer peripheral edge 132 has a semicircular radial cross-section with tapered surfaces 132a on both sides.

The center disk 130 slidably comes into contact with the tapered surface 21 and the piston-side tapered surface 7f, respectively, while the R surface 133 of the outer peripheral edge 132 is sandwiched from both sides in the direction of the axis L.

In the center disk 130, the piston-side tapered surface 7f, the tapered surface 21, and the outer peripheral edge 132 slidably come into contact with each other by the pressing force from the piston 7, and the attitude of the cutting tool 8 is restored while the radial motion is suppressed.

Note that the R surface 133 of the outer peripheral edge 132 may have a curvature radius R which is necessary for sliding. Due to the shape having the tapered surface 132a, the surface portion 131 and the outer peripheral edge 132 are smoothly connected to each other, whereby sufficient rigidity is exhibited.

Other configurations and operation effects are substantially the same as those of the deburring tool 1 of the embodiment, and therefore description thereof is omitted.

Second Modification

Figure 6:
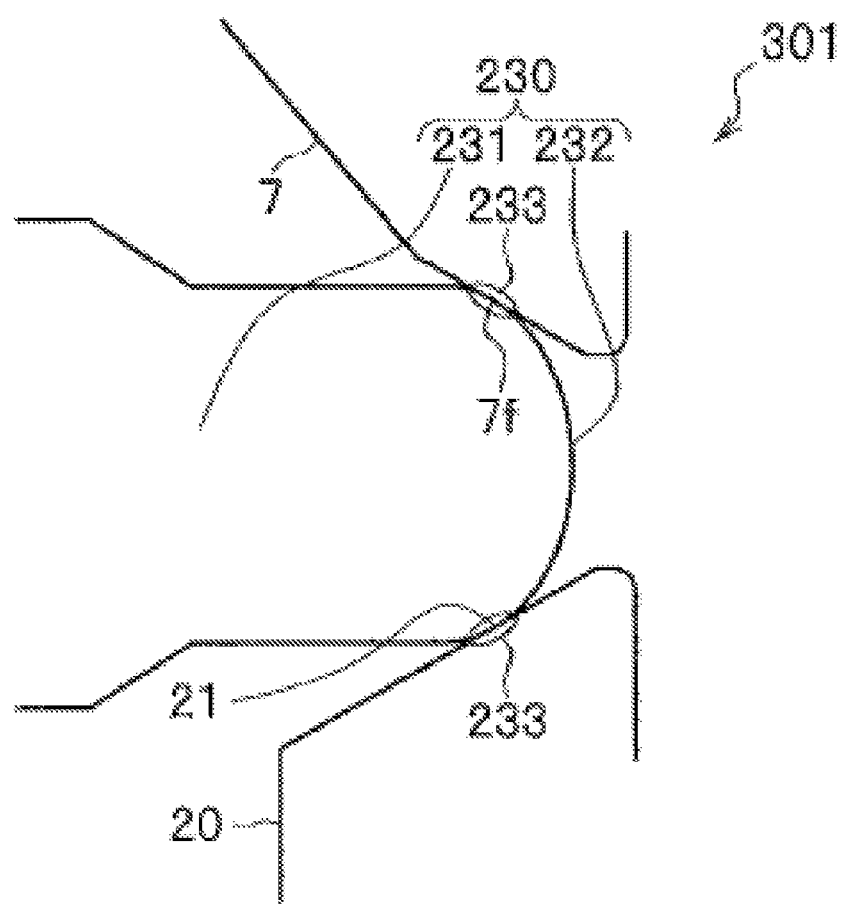
FIG. 6 is an enlarged cross-sectional view showing an end portion of the center disk of the Second Modification.

FIG. 6 is an enlarged cross-sectional view of a main part of a portion where the center disk (pressed member) 230 abuts against the piston 7 and the tapered ring 20 in the deburring tool 301 of the second modification.

In the deburring tool 301 of the second modification, the surface portion 231 of the center disk 230 is formed so as to have a thinner thickness at a portion close to the outer peripheral edge than at a portion close to the center axis. A ring-shaped outer peripheral edge 232 is formed on the peripheral edge of the surface portion 231. The outer peripheral edge 232 has a semicircular radial cross-section.

In the center disk 230, the R surface 233 of the outer peripheral edge 232 slidably comes into contact with the piston-side tapered surface 7f and the tapered ring 20 sandwiched from both sides in the direction of the axis L.

The center disk 230 is centered by the pressing force from the piston 7 so that the outer peripheral edge 232 slidably comes into contact with the piston-side tapered surface 7f and the tapered surface 21, respectively, thereby suppressing radial movements and restoring the attitude of the cutting tool 8.

Note that the R surface 233 of the outer peripheral edge 232 may have a curvature radius R which is necessary for sliding. The base surface portion 31 may be thicker than the outer periphery. The base surface portion 31 may have the same thickness as the outer periphery.

Other configurations and operation effects are substantially the same as those of the deburring tool 1 of the embodiment, and therefore description thereof is omitted.

It should be noted that the present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST 1, 201, 301 Deburring tool
3 Spindle device
4 Spindle
4a Attachment portion
7 Piston
7e Pressure receiving surface
7f Piston-side tapered surface
8 Cutting tool
10 Separate ring
13 Spring (elastic member)
15 Flow path
20 Tapered ring
30, 130, 230 Center disk (pressed member)
100 Housing space

What is claimed is:

1. A deburring tool, comprising:
a cylindrical housing;
a spindle loosely fitted and supported to be tiltable with respect to an axis of the housing, the spindle having a rotatable attachment portion for detachably attaching a cutting tool at a distal end;
a pressed member arranged to the spindle;
a piston slidably disposed inside the housing, the piston configured to press the pressed member toward the distal end;
an elastic member configured to urge the piston toward the distal end;
a separate ring arranged between the piston and the elastic member; and
a flow path for supplying a compressible fluid between the separate ring and the piston.

2. The deburring tool according to claim 1, further comprising:
a tapered ring located inside a distal end portion of the housing, the tapered ring having a tapered surface inclined to decrease in diameter toward the distal end;
wherein the pressed member is a center disk arranged between the piston and the tapered ring, the center disk has an outer peripheral edge, and
the outer peripheral edge slidably comes into contact with the tapered surface by a pressing force from the piston so that a center axis of the center disk coincides with an axis of the housing.

3. The deburring tool according to claim 2, wherein
the piston has a piston-side tapered surface on a distal side, the piston-side tapered surface is inclined to increase in diameter toward the distal end, and the piston-side tapered surface slidably comes into contact with the outer peripheral edge.

4. The deburring tool according to claim 3, wherein
an R surface is formed on a surface of the outer peripheral edge, and
the R surface slidably comes into contact with at least one of the piston-side tapered surface and the tapered surface.

5. The deburring tool according to claim 1, further comprising:
a first wear ring fitted to an outer peripheral surface of the separate ring, the first wear ring configured to slidably come into contact with an inner peripheral surface of the housing.

6. The deburring tool according to claim 1, further comprising:
a second wear ring fitted to an outer peripheral surface of the piston, the second wear ring configured to slidably come into contact with the inner peripheral surface of the housing.

7. The deburring tool according to claim 1, further comprising:
a plurality of guide pins configured to slidably come into contact with an outer peripheral surface of a rear end side of the piston.

8. The deburring tool according to claim 2, further comprising:
a first wear ring fitted to an outer peripheral surface of the separate ring, the first wear ring configured to slidably come into contact with an inner peripheral surface of the housing.

9. The deburring tool according to claim 3, further comprising:
a first wear ring fitted to an outer peripheral surface of the separate ring, the first wear ring configured to slidably come into contact with an inner peripheral surface of the housing.

10. The deburring tool according to claim 4, further comprising:
a first wear ring fitted to an outer peripheral surface of the separate ring, the first wear ring configured to slidably come into contact with an inner peripheral surface of the housing.

11. The deburring tool according to claim 2, further comprising:
a second wear ring fitted to an outer peripheral surface of the piston, the second wear ring configured to slidably come into contact with the inner peripheral surface of the housing.

12. The deburring tool according to claim 3, further comprising:
a second wear ring fitted to an outer peripheral surface of the piston, the second wear ring configured to slidably come into contact with the inner peripheral surface of the housing.

13. The deburring tool according to claim 4, further comprising:
a second wear ring fitted to an outer peripheral surface of the piston, the second wear ring configured to slidably come into contact with the inner peripheral surface of the housing.

14. The deburring tool according to claim 5, further comprising:
a second wear ring fitted to an outer peripheral surface of the piston, the second wear ring configured to slidably come into contact with the inner peripheral surface of the housing.

15. The deburring tool according to claim 2, further comprising:
a plurality of guide pins configured to slidably come into contact with an outer peripheral surface of a rear end side of the piston.

16. The deburring tool according to claim 3, further comprising:
a plurality of guide pins configured to slidably come into contact with an outer peripheral surface of a rear end side of the piston.

17. The deburring tool according to claim 4, further comprising:
a plurality of guide pins configured to slidably come into contact with an outer peripheral surface of a rear end side of the piston.

18. The deburring tool according to claim 5, further comprising:
a plurality of guide pins configured to slidably come into contact with an outer peripheral surface of a rear end side of the piston.

19. The deburring tool according to claim 6, further comprising:
a plurality of guide pins configured to slidably come into contact with an outer peripheral surface of a rear end side of the piston.

* * * * *